US012567659B2

(12) United States Patent
Jang et al.

(10) Patent No.: US 12,567,659 B2
(45) Date of Patent: Mar. 3, 2026

(54) BATTERY PACK AND DEVICE INCLUDING THE SAME

(71) Applicant: LG ENERGY SOLUTION, LTD., Seoul (KR)

(72) Inventors: Byung Do Jang, Daejeon (KR); Donghyun Kim, Daejeon (KR); Yongho Chun, Daejeon (KR); Hyoungsuk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 670 days.

(21) Appl. No.: 17/798,422

(22) PCT Filed: Apr. 8, 2021

(86) PCT No.: PCT/KR2021/004398
§ 371 (c)(1),
(2) Date: Aug. 9, 2022

(87) PCT Pub. No.: WO2021/221340
PCT Pub. Date: Nov. 4, 2021

(65) Prior Publication Data
US 2023/0080173 A1      Mar. 16, 2023

(30) Foreign Application Priority Data
Apr. 29, 2020      (KR) ......................... 10-2020-0052250

(51) Int. Cl.
*H01M 50/569*      (2021.01)
*H01M 10/42*      (2006.01)
(Continued)

(52) U.S. Cl.
CPC ..... *H01M 50/569* (2021.01); *H01M 10/4257* (2013.01); *H01M 10/482* (2013.01);
(Continued)

(58) Field of Classification Search
CPC ............. H01M 10/613; H01M 10/625; H01M 10/6556; H01M 10/6567; H01M 10/4257;
(Continued)

(56) References Cited

U.S. PATENT DOCUMENTS

2011/0206948 A1 *   8/2011   Asai .................... H01M 10/617
                                                            429/7
2012/0129024 A1      5/2012   Marchio et al.
(Continued)

FOREIGN PATENT DOCUMENTS

CN        103227352 A      7/2013
CN        197221726 A      9/2017
(Continued)

OTHER PUBLICATIONS

Extended European Search Report for European Application No. 21796421.2, dated Aug. 17, 2023.
(Continued)

*Primary Examiner* — Karie O'Neill Apicella
(74) *Attorney, Agent, or Firm* — Birch, Stewart, Kolasch & Birch, LLP

(57) ABSTRACT

A battery pack includes a plurality of battery modules including a battery cell stack in which a plurality of battery cells are stacked, a terminal bus bar connected to the battery cell, and a sensing assembly for measuring the temperature and voltage of the battery cell; a pack frame for storing the battery module; an HV line connected to the terminal bus bar of the battery module; an LV line connected to the sensing assembly of the battery module; and a pack coolant pipe for supplying a coolant to the battery module, wherein the HV line and the LV line are located above the pack coolant pipe.

14 Claims, 7 Drawing Sheets

<u>10</u>

Conventional
Art

(51) Int. Cl.

| | |
|---|---|
| *H01M 10/48* | (2006.01) |
| *H01M 10/613* | (2014.01) |
| *H01M 10/625* | (2014.01) |
| *H01M 10/6556* | (2014.01) |
| *H01M 10/6567* | (2014.01) |
| *H01M 50/249* | (2021.01) |
| *H01M 50/258* | (2021.01) |
| *H01M 50/296* | (2021.01) |
| *H01M 50/505* | (2021.01) |
| *H01M 50/588* | (2021.01) |

(52) U.S. Cl.
CPC ....... *H01M 10/486* (2013.01); *H01M 10/613* (2015.04); *H01M 10/625* (2015.04); *H01M 10/6556* (2015.04); *H01M 10/6567* (2015.04); *H01M 50/249* (2021.01); *H01M 50/258* (2021.01); *H01M 50/296* (2021.01); *H01M 50/505* (2021.01); *H01M 50/588* (2021.01); *H01M 2010/4271* (2013.01); *H01M 2220/20* (2013.01)

(58) Field of Classification Search
CPC ............. H01M 10/482; H01M 10/486; H01M 50/569; H01M 50/249; H01M 50/296; H01M 50/258; H01M 50/505; H01M 50/588
See application file for complete search history.

(56) References Cited

U.S. PATENT DOCUMENTS

| | | |
|---|---|---|
| 2014/0017546 A1 | 1/2014 | Yanagi |
| 2015/0236314 A1 | 8/2015 | Lee et al. |
| 2017/0047623 A1 | 2/2017 | Kim et al. |
| 2018/0151927 A1 | 5/2018 | An et al. |
| 2018/0331401 A1 | 11/2018 | Glass |
| 2019/0044200 A1 | 2/2019 | Motoyoshi et al. |
| 2019/0115637 A1 | 4/2019 | Kim et al. |
| 2019/0260099 A1 | 8/2019 | Ju et al. |
| 2019/0291558 A1 | 9/2019 | Goto et al. |
| 2020/0067155 A1 | 2/2020 | Hwang et al. |
| 2021/0013565 A1 | 1/2021 | Pucher et al. |

FOREIGN PATENT DOCUMENTS

| | | |
|---|---|---|
| CN | 208400912 U | 1/2019 |
| CN | 109428019 A | 3/2019 |
| CN | 109473577 A | 3/2019 |
| CN | 208608328 U | 3/2019 |
| CN | 110071237 A | 7/2019 |
| CN | 209071426 U | 7/2019 |
| CN | 110168799 A | 8/2019 |
| CN | 110277605 A | 9/2019 |
| CN | 210006775 U | 1/2020 |
| CN | 210006867 U | 1/2020 |
| CN | 110854320 A | 2/2020 |
| CN | 210200838 U | 3/2020 |
| CN | 214625290 U | 11/2021 |
| DE | 10 2013 009 713 A1 | 12/2014 |
| DE | 10 2013 011 692 A1 | 1/2015 |
| DE | 102015221265 A1 | 5/2017 |
| EP | 2 362 463 A2 | 8/2011 |
| EP | 3 291 357 A1 | 3/2018 |
| EP | 3493292 A1 | 6/2019 |
| EP | 3553876 A1 | 10/2019 |
| JP | 2010-15788 A | 1/2010 |
| JP | 2014-22092 A | 2/2014 |
| JP | 2015-69845 A | 4/2015 |
| JP | 2019-129042 A | 8/2019 |
| JP | 2019-169281 A | 10/2019 |
| KR | 10-2014-0062603 A | 5/2014 |
| KR | 10-2017-0019770 A | 2/2017 |
| KR | 10-2018-0081996 A | 7/2018 |
| KR | 10-2018-0091579 A | 8/2018 |
| KR | 10-2018-0135701 A | 12/2018 |
| KR | 10-2019-0043277 A | 4/2019 |
| KR | 10-2020-0021608 A | 3/2020 |
| WO | WO 2017/033412 A1 | 3/2017 |
| WO | WO 2017/150012 A1 | 9/2017 |

OTHER PUBLICATIONS

International Search Report (PCT/ISA/210) issued in PCT/KR2021/004398, dated Jul. 29, 2021.

Written Opinion of the International Searching Authority (PCT/ISA/237) issued in PCT/KR2021/004398, dated Jul. 29, 2021.

\* cited by examiner

Conventional
Art

[FIG. 2]
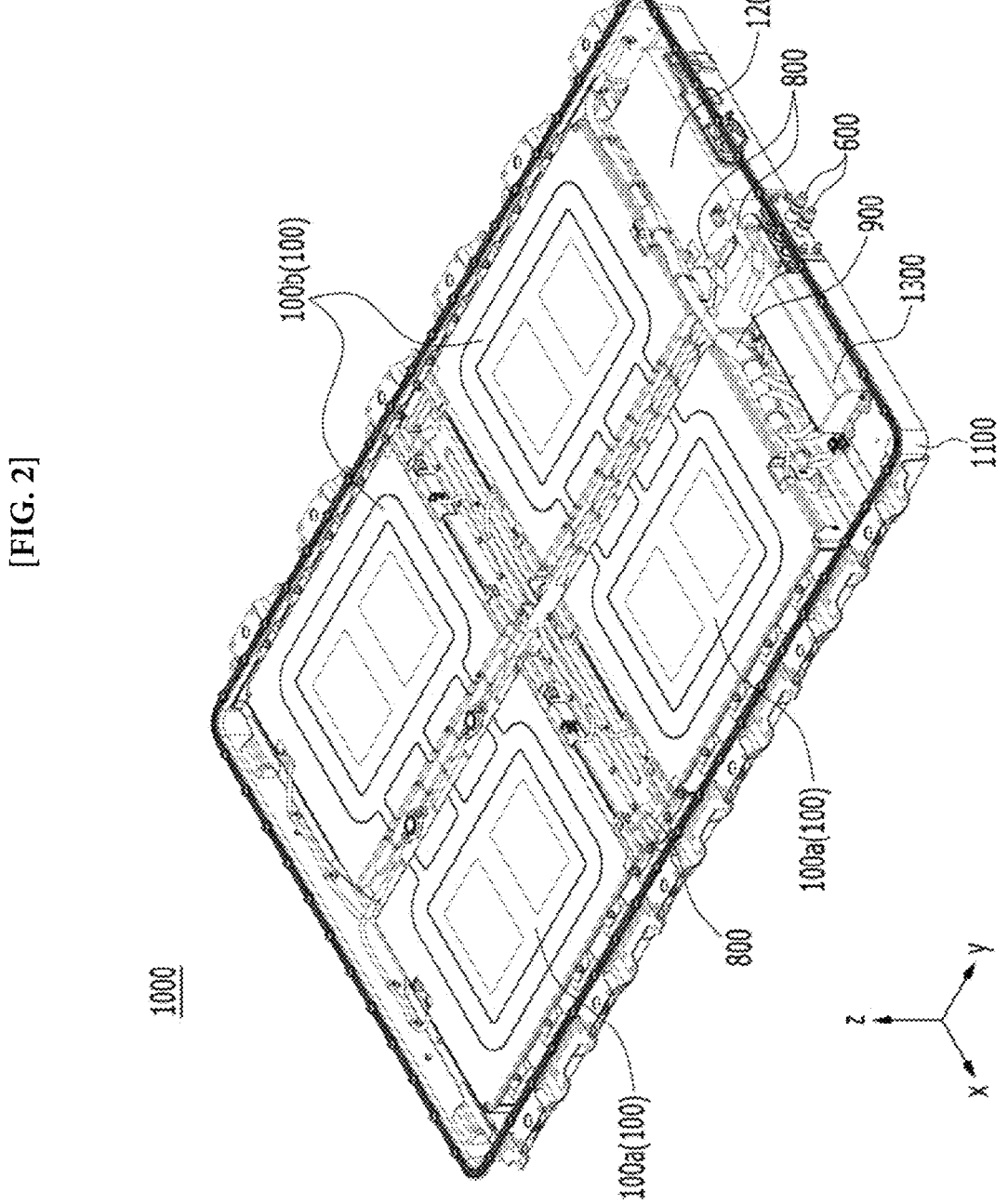

【FIG. 3】
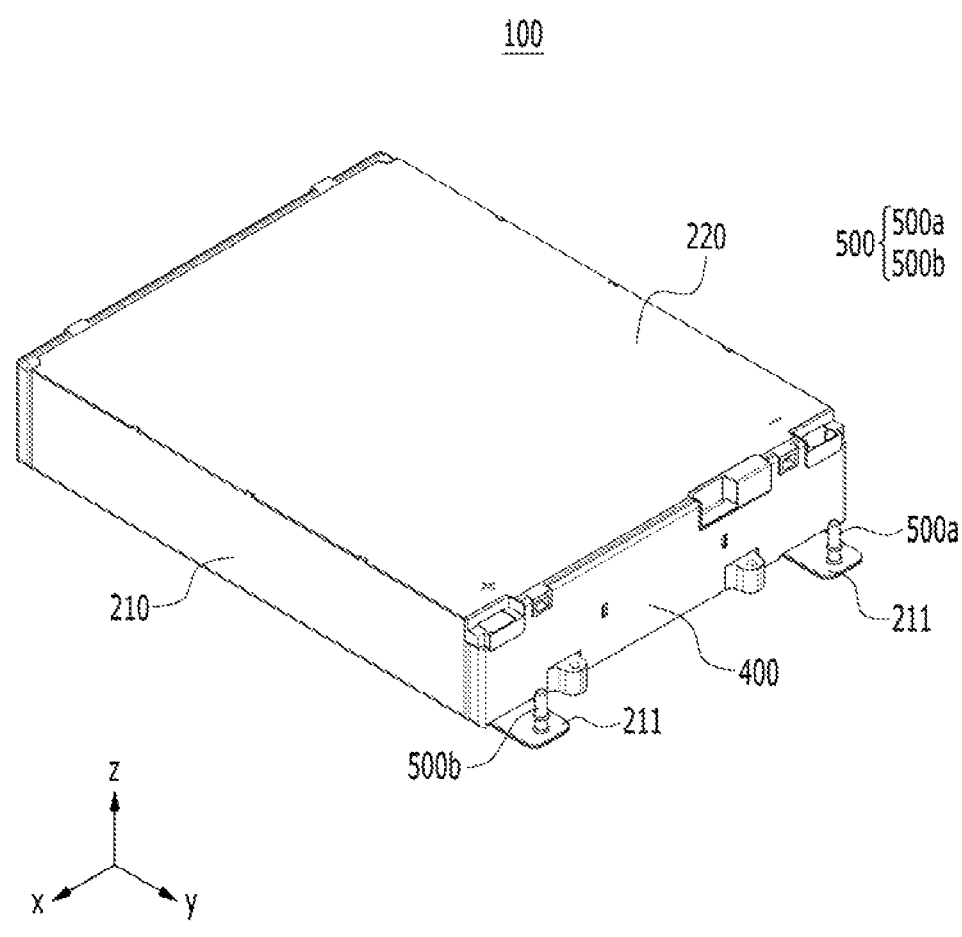

【FIG. 4】
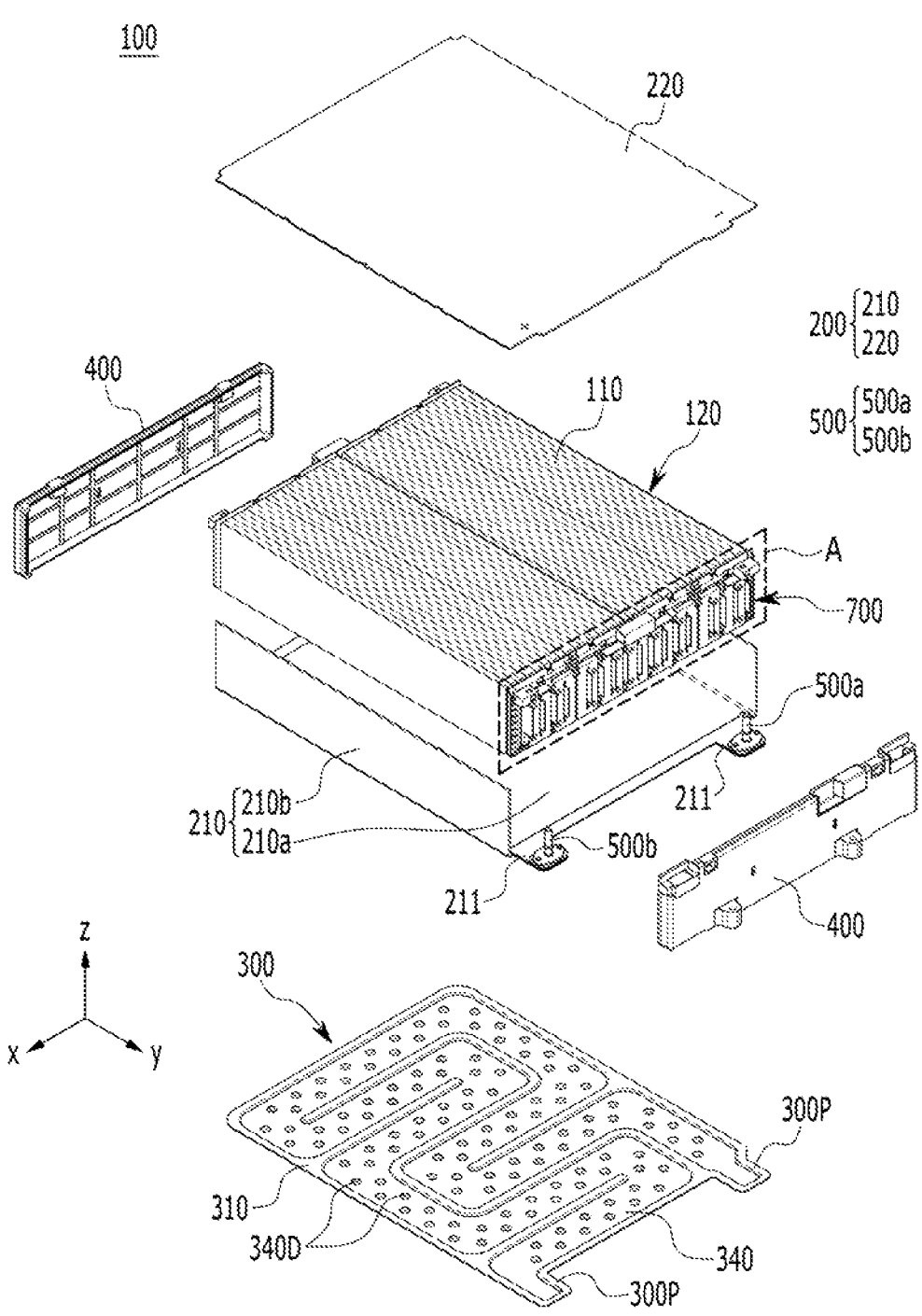

【FIG. 5】
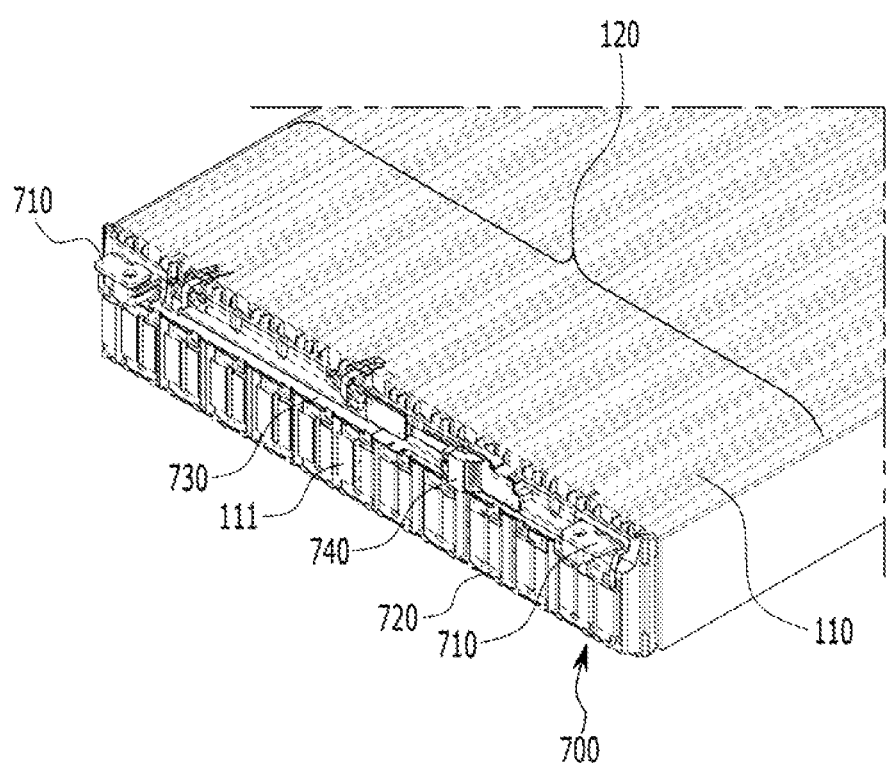

[FIG. 6]
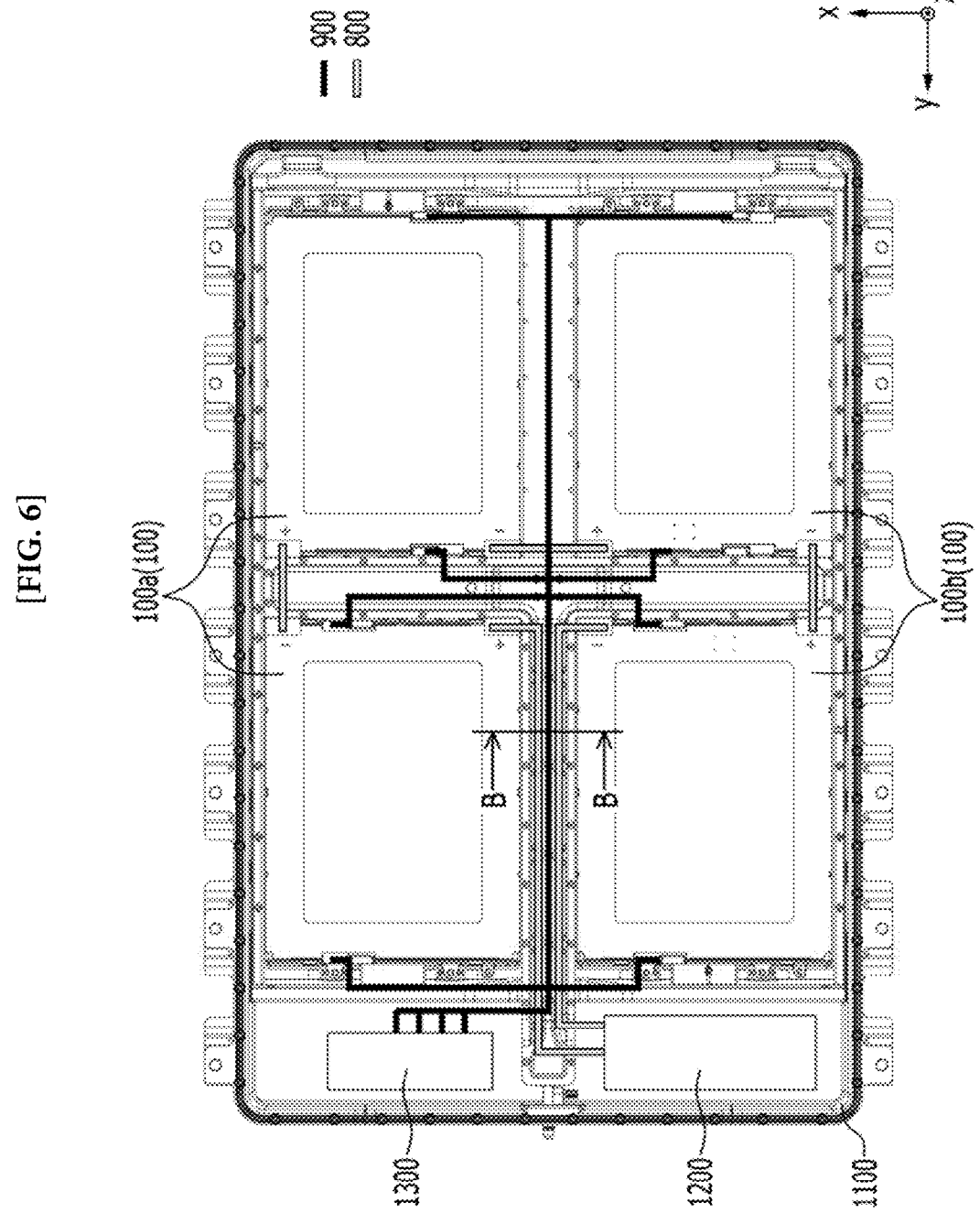

【FIG. 7】
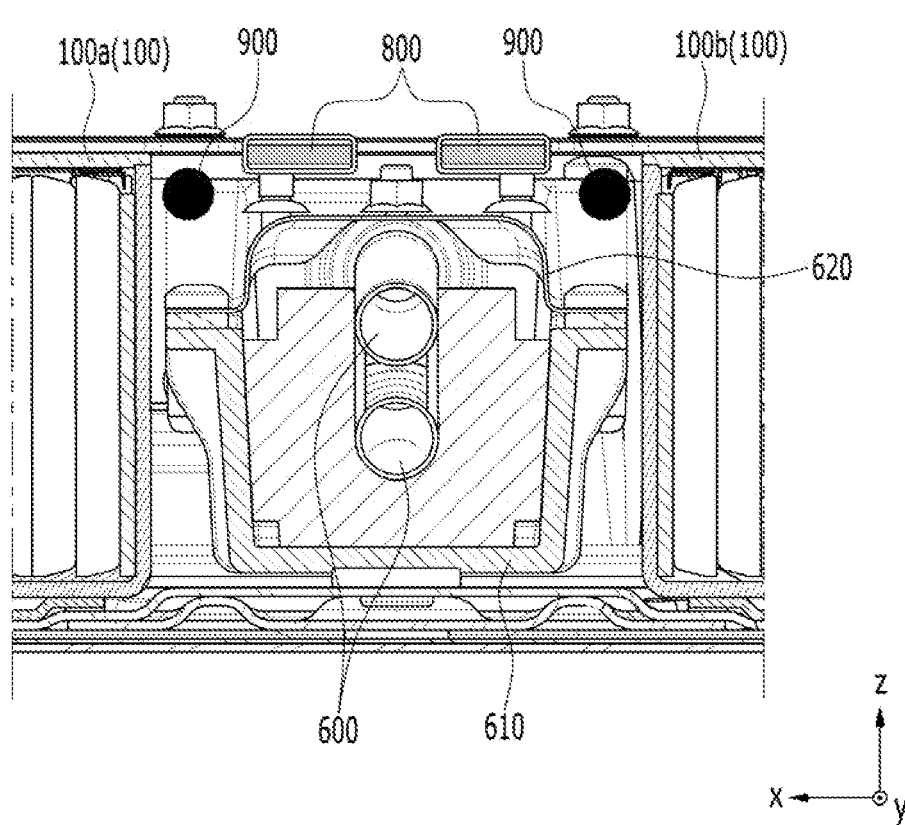

BATTERY PACK AND DEVICE INCLUDING THE SAME

TECHNICAL FIELD

Cross Citation with Related Application(s)

This application claims the benefit of Korean Patent Application No. 10-2020-0052250 filed on Apr. 29, 2020 with the Korean Intellectual Property Office, the disclosure of which is incorporated herein by reference in its entirety.

The present disclosure relates to a battery pack and a device including the same, and more particularly to a battery pack having improved safety, and a device including the same.

BACKGROUND ART

In modern society, as portable devices such as a mobile phone, a notebook computer, a camcorder and a digital camera has been daily used, the development of technologies in the fields related to mobile devices as described above has been activated. In addition, rechargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is an increasing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior material, i.e., battery case, which seals and accommodates the electrode assembly together with an electrolyte.

Generally, the lithium secondary battery may be classified based on the shape of the exterior material into a can type secondary battery in which the electrode assembly is embedded in a metal can, and a pouch-type secondary battery in which the electrode assembly is embedded in a pouch of an aluminum laminate sheet.

In the case of a secondary battery used for a small-sized device, two to three battery cells are arranged, but in the case of a secondary battery used for a medium to large-sized device such as an automobile, a battery module in which a large number of battery cells are electrically connected is used. In such a battery module, a plurality of battery cells are connected to each other in series or parallel to form a cell stack, thereby improving capacity and output. In addition, one or more battery modules may be mounted together with various control and protection systems such as a battery disconnect unit (BDU), a battery management system (BMS) and a cooling system to form a battery pack.

When a secondary battery rises higher than an appropriate temperature, the secondary battery may undergo performance deterioration, and in the worst case, may explode or catch fire. In particular, in a battery module or a battery pack provided with a plurality of secondary batteries, that is, battery cells, the temperature may rise more quickly and drastically due to buildup of heat emitted from the plurality of battery cells in a small space. In other words, in the case of a battery module in which a plurality of battery cells are stacked and a battery pack equipped with such a battery module, high output can be obtained, but it is not easy to remove heat generated from the battery cells during charging and discharging. If the heat dissipation of the battery cell is not properly performed, the deterioration of the battery cell will be accelerated and the life will be shortened, and the possibility of explosion or ignition will increase.

Moreover, a battery module included in a battery pack for vehicle is often exposed to direct sunlight and to be in a high-temperature condition such as the summer season or a desert region. Therefore, when configuring a battery module or a battery pack, it may be very important to stably and effectively ensure the cooling performance.

FIG. 1 is a perspective view of a conventional battery pack

Referring to FIG. 1, the conventional battery pack 10 may include a plurality of battery modules 1 including a plurality of battery cells, a coolant pipe 2 for supplying a coolant to the battery module 1, HV (High Voltage) line 3 for connecting the battery module 1 and BDU (Battery Disconnect Unit), and LV (Low Voltage) line 4 for connecting the battery module 1 and BMS (Battery Management System). The battery cells inside the battery module 1 generate electrical energy and dissipate heat, and the coolant pipe 2 supplies a coolant to the periphery of the battery module 1, so that cooling can be performed.

At this time, in the conventional battery pack 10, the battery module 1 may be composed of two layers, and leakage of the coolant may occur from the coolant pipe 2 supplying the coolant to the battery module 1 located in the upper part. When the leaked coolant contacts the HV line 3 or LV line 4 located in the lower part of the coolant pipe 2, a short circuit may occur.

Further, in the conventional battery pack 10, since the LV line 4 is located at the edge close to the pack housing (not shown), there is a high possibility that a short circuit occurs when an external impact or vibration occurs In the case of the short circuit due to coolant leakage or external impact, etc., since it can lead to explosion or ignition, it can be said that it is important to develop a battery pack with improved safety while having cooling performance.

DETAILED DESCRIPTION OF THE INVENTION

Technical Problem

An object of the present disclosure is to provide a battery pack having improved safety, and a device including the same.

However, the problem to be solved by embodiments of the present disclosure is not limited to the above-described problems, and can be variously expanded within the scope of the technical idea included in the present disclosure.

Technical Solution

A battery pack according to the present disclosure includes: a plurality of battery modules, each battery module of the plurality of battery modules including a battery cell stack in which a plurality of battery cells are stacked in a first direction, a terminal bus bar connected to the plurality of battery cells, and a sensing assembly for measuring the temperature and voltage of the plurality of battery cells; a pack frame for storing the plurality of battery modules; at least one high voltage (HV) line connected to the terminal bus bar of the plurality of battery modules; at least one low voltage (LV) line connected to the sensing assembly of the plurality of battery modules; and a pack coolant pipe for supplying a coolant to the plurality of battery modules, wherein the at least one HV line and the at least one at least one LV line are located above the pack coolant pipe.

The battery pack may further include a pack refrigerant pipe housing for storing the pack coolant pipe.

The battery pack may further include a housing cover for covering an opened upper side of the pack coolant pipe housing, and the at least one HV line and the at least one LV line may be located above the housing cover.

The plurality of battery modules may include a first battery module and a second battery module facing each other in the first direction.

The battery pack may further include a BDU (battery disconnect unit) module connected to the at least one HV line to control an electrical connection of the plurality of battery modules.

The at least one HV line connected to the BDU module may be located between the first battery module and the second battery module.

The battery pack may further include a BMS (battery management system) module that is connected to the at least one LV line to monitor and control an operation of the plurality of battery modules.

The at least one LV line connected to the BMS module may be located between the first battery module and the second battery module.

The battery pack may further include a module connector for connecting the sensing assembly and the at least one LV line.

The battery module may further include end plates located on open sides of the module frame, wherein an opening may be formed in at least one of the end plates, so that the terminal bus bar and the module connector are exposed, and the first battery module and the second battery module may each be composed of two modules, the two first battery modules being disposed so that the end plates face each other, and the two second battery modules being disposed so that the end plates face each other.

Advantageous Effects

According to the embodiments of the present disclosure, by simplifying the arrangement of the HV and LV lines and arranging them in a stable position, the safety of the battery pack can be improved.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 2 is a perspective view of a battery pack according to one embodiment of the present disclosure.

FIG. 3 is a perspective view of a battery module included in the battery pack of FIG. 2.

FIG. 4 is an exploded perspective view of the battery module of FIG. 3.

FIG. 5 is a partial perspective view showing an enlarged portion "A" of FIG. 4.

FIG. 6 is a plan view of the battery pack of FIG. 2 as viewed from the xy plane.

FIG. 7 is a cross-sectional view taken along the cutting line B of FIG. 6.

DETAILED DESCRIPTION OF THE EMBODIMENTS

Figure 1:
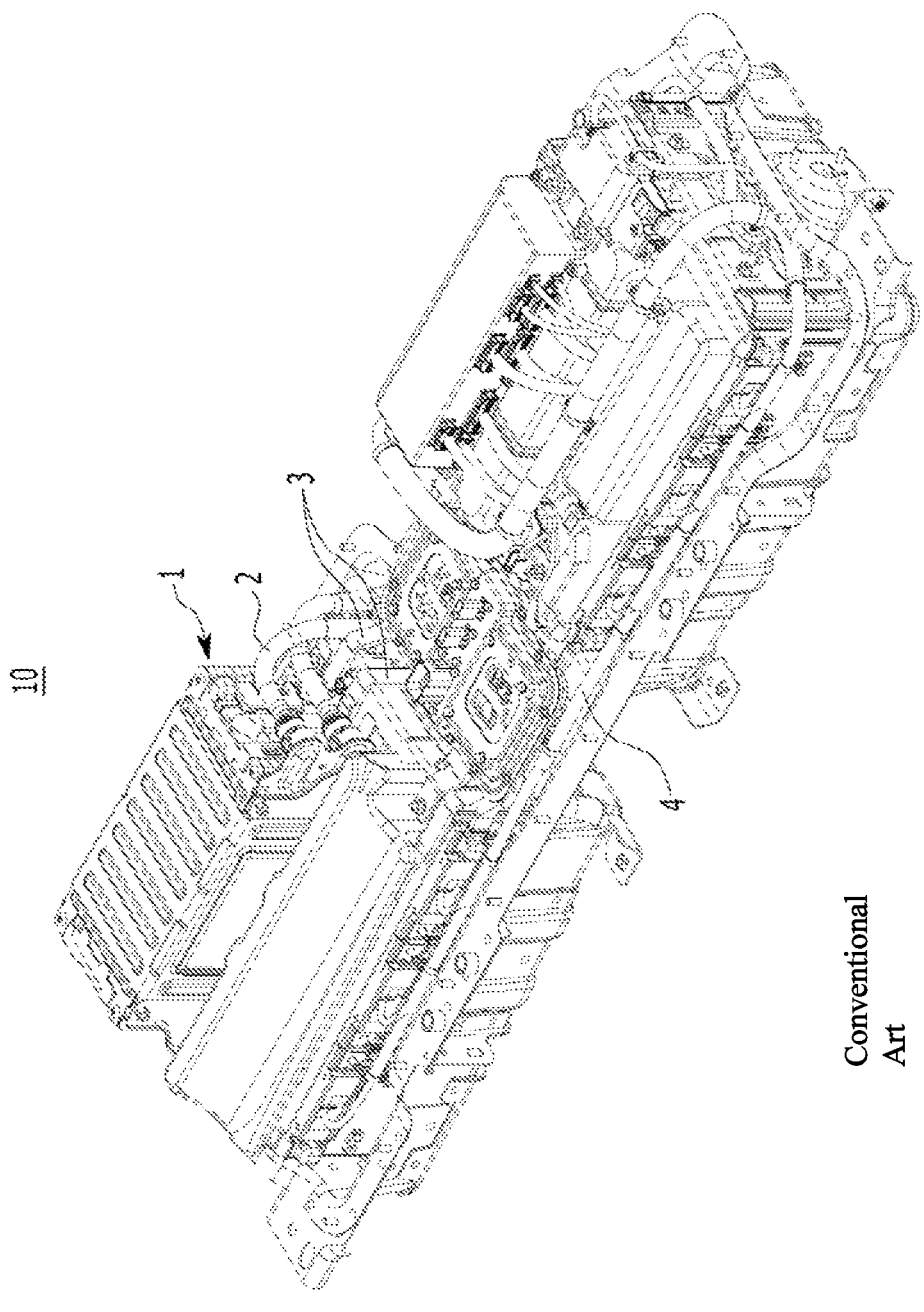
FIG. 1 is a perspective view of a conventional battery pack.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 2 is a perspective view of a battery pack according to one embodiment of the present disclosure. FIG. 3 is a perspective view of a battery module included in the battery pack of FIG. 2. FG. 4 is an exploded perspective view of the battery module of FIG. 3.

Referring to FIGS. 2 to 4, a battery pack 1000 includes a plurality of battery modules 100, a pack frame 1100 for storing the battery module 100, an HV line 800 connected to the terminal bus bar, an LV line 900 connected to the sensing assembly of the battery module 100, and a pack coolant pipe 600 for supplying a coolant to the battery module 100. The battery module 100 includes a battery cell stack 120 in which a plurality of battery cells 110 are stacked, a terminal bus bar connected to the battery cell 110, and a sensing assembly for measuring the temperature and voltage of the battery cell 110.

First, the battery cell 110 may be a pouch-type battery cell. Such a pouch-type battery cell may be formed by storing an electrode assembly in a pouch case of a laminate sheet including a resin layer and a metal layer, and then heat-sealing the outer periphery of the pouch case. At this time, the battery cell 110 may be formed in a rectangular sheet-like structure.

The battery cells 110 may be composed of a plurality of cells, and the plurality of battery cells 110 are stacked so that they can be electrically connected to each other to form a battery cell stack 120. In particular, as shown in FIG. 4, a plurality of battery cells 110 may be stacked along the x-axis direction.

The module frame 200 for storing the battery cell stack 120 may include an upper cover 220 and a U-shaped frame 210.

The U-shaped frame 210 may include a bottom portion 210*a* and two side portions 210*b* extending upward from both end parts of the bottom portion 210*a*. The bottom portion 210*a* may cover the lower surface (in the direction opposite to the z-axis) of the battery cell stack 120, and the side portions 210*b* may cover both side surfaces (the x-axis direction and the direction opposite to the same) of the battery cell stack 120.

The upper cover 220 may be formed in a single plate-shaped structure that wraps the lower surface wrapped by the U-shaped frame 210 and the remaining upper surface (z-axis direction) excluding the both side surfaces. The upper cover 220 and the U-shaped frame 210 can be joined by welding or the like in a state in which the corresponding corner portions are in contact with each other, thereby forming a structure that covers the battery cell stack 120 vertically and horizontally. The battery cell stack 120 may be physically protected via the upper cover 220 and the U-shaped frame 210. For this purpose, the upper cover 220 and the U-shaped frame 210 may include a metal material having a predetermined strength.

Meanwhile, although not specifically shown, the module frame 200 according to the modified embodiment may be a mono frame in the form of a metal plate in which the upper surface, the lower surface, and both sides are integrated. That is, it is not a structure in which the U-shaped frame 210 and the upper cover 220 are combined with each other, but a structure in which the upper surface, the lower surface, and both sides are integrated by being manufactured by extrusion molding.

The end plate 400 may be formed so as to be located on both open sides (y-axis direction and the direction opposite to the same) of the module frame 200 corresponding to each other to cover the battery cell stack 120. The end plate 400 may physically protect the battery cell stack 120 and other electrical equipment from external impact.

The battery module 100 may include a heat sink 300 located below the bottom portion 210*a* of the module frame 200, wherein a coolant may supply to the heat sink 300 via a cooling port 500 and the coolant may discharge from the heat sink 300. Specifically, the cooling port 500 may include a coolant injection port 500*a* and a coolant discharge port 500*b* located apart from each other. The pack coolant pipe 600 may include a pack coolant supply pipe and a pack coolant discharge pipe, and the coolant injection port 500*a* and the coolant discharge port 500*b* may be connected to the pack coolant supply pipe and the pack refrigerant discharge pipe, respectively.

The module frame 200 according to the present embodiment may include a module frame protrusion 211 formed so that the bottom portion 210*a* of the module frame 200 extends and passes through the end plate 400. At this time, the coolant flown in and discharged by the cooling port 500 connecting to the upper surface of the module frame protrusion 211 can be supplied to a heat sink 300 via the module frame protrusion 211 and discharged from the heat sink 300.

Specifically, the cooling port 500 according to the present embodiment includes a coolant injection port 500*a* for supplying a coolant to the heat sink 300 and a coolant discharge port 500*b* for discharging the coolant from the heat sink 300, and the refrigerant injection port 500*a* and the refrigerant discharge port 500*b* may be respectively connected to a pack coolant pipe 600. The module frame protrusion 211 may include a first module frame protrusion and a second module frame protrusion which are located apart from each other on one side of the module frame 200. The coolant injection port 500*a* may be disposed on the first module frame protrusion, and the coolant discharge port 500*b* may be disposed on the second module frame protrusion.

With the configuration as above, the pack coolant pipe 600 may supply a coolant to the battery module 100 or discharge the coolant from the battery module 100.

In the following, the terminal bus bar 710 and the sensing assembly 730 will be described in detail with reference to FIG. 5 and the like.

FIG. 5 is a partial perspective view showing an enlarged portion "A" of FIG. 4.

Referring to FIGS. 2, 4 and 5, the battery module 100 according to the present embodiment may include a terminal bus bar connected to the battery cell 110 and a sensing assembly for measuring the temperature and voltage of the battery cell.

Specifically, the battery module 100 may include a bus bar frame 700 located in the protruding direction of the electrode lead 111 protruding out from the battery cell 110. A terminal bus bar 710, a bus bar 720, a sensing assembly 730, and a module connector 740 may be mounted on the bus bar frame 700.

The bus bar 720 takes a charge of a function for electrically connecting the battery cells 110 included in the battery cell stack 120. The electrode lead 111 of the battery cell 110 may be curved after passing through a slit formed in the bus bar frame 700, and connected with the bus bar 720. Accordingly, the battery cells 110 may be connected in series or in parallel.

The terminal bus bar 710 is connected with the electrode lead 111 of the battery cell 110, one end of which is exposed to the outside of the battery module 100, and thus, it can take a charge of a function for connecting the battery cell 110 electrically connected via the bus bar 720 to the outside. The terminal bus bar 710 may be connected to an HV line 800 described later to be electrically connected to another battery module 100 or connected to a battery disconnect unit (BDU) module.

The connection method of the electrode lead 111 and the bus bar 720 or the connection method of the electrode lead 111 and the terminal bus bar 710 are not particularly limited, and a method such as welding may be applied.

The sensing assembly 730 can include sensors to measure the temperature or voltage of the battery cell 110. FIG. 5 shows a sensing assembly 730 including sensors in contact with the bus bar 720 to measure the voltage of the battery cell 110. The sensing assembly 730 can be connected to the module connector 740. The sensing assembly 730 can be connected to an LV line 900 described later via a module connector 740 to be connected to a battery management system (BMS) module.

In the following, the HV line 800 and the LV line 900 will be described in detail with reference to FIGS. 6 and 7, and the like.

FIG. 6 is a plan view of the battery pack of FIG. 2 as viewed from the xy plane, and FIG. 7 is a cross-sectional view taken along the cutting line B of FIG. 6.

Referring to FIGS. 2, 5, 6 and 7, the battery pack 1000 includes an HV line 800 connected to the terminal bus bar 710 of the battery module 100 and an LV line 900 connected to the sensing assembly 730 of the battery module 100. Further, the battery pack 1000 may further include a BDU (battery disconnect unit) module 1200, which is connected to at least one of the HV lines 800 to control the electrical connection of a plurality of battery modules 100, and a BMS (battery management system) module 1300, which is connected to at least one of the LV lines 900 to monitor and control the operation of the plurality of battery modules 100.

Each battery modules 100 may be electrically connected to each other via an HV line 800, and finally connected to the BDU module 1200 via the HV line 800. The BDU module 1200 is a module that is disposed between the battery module 100 and an inverter, and includes a relay, a resistor, and the like. The BDU module 1200 plays a role of stably supplying or breaking battery power to a power system of a vehicle, and thus protecting the power system of the vehicle when a fault current occurs.

Each battery module 100 is connected to the BMS module 1300 via a LV line 900, so that the measured temperature or voltage data of the battery cell 110 inside the battery module 100 may be transmitted to the BMS module 1300. The BMS module 1300 plays a role of managing the temperature or voltage of each battery module 100 based on the measured temperature or voltage data. Meanwhile, in FIG. 6, for convenience of description, one LV line 900 is shown between the first battery module 100a and the second battery module 100b, but it may be composed of two LV lines 900 according to the design as shown in FIG. 7. That is, the number of LV lines 900 according to the present embodiment is not particularly limited, and the number thereof may vary depending on the design of the battery pack.

At this time, as shown in FIG. 7, the HV line 800 and the LV line 900 according to the present embodiment are located above the pack coolant pipe 600, and more specifically, they can be located above the housing cover 620 described later. The battery pack 1000 may be applied to transportation means such as electric vehicles and hybrids, but a situation may occur in which a coolant such as a cooling water leaks due to an assembly failure or an accident during operation. According to this embodiment, even if leakage of the coolant occurs in the pack coolant pipe 600, it is possible to prevent the leaked coolant from coming into contact with the HV line 800 and the LV line 900 to cause a short circuit. That is, the HV line 800 and the LV line 900 can be located above the pack coolant pipe 600, thereby improving the insulation performance of the battery pack 1000. As shown in FIG. 1, it can be distinguished from a conventional battery in which in which there is a risk that the coolant leaking from the coolant pipe 2 may come into contact with the HV line 3 or LV line 4 located in the lower part to cause a short circuit.

Further, the battery pack 1000 according to the present embodiment may further include a pack coolant pipe housing 610 for storing the pack coolant pipe 600 and a housing cover 620 for covering the opened upper side of the pack coolant pipe housing 610. The pack coolant pipe housing 610 and the housing cover 620 may be connected along the pack coolant pipe 600. The refrigerant leaked from the pack coolant pipe 600 may penetrate into the inside of plural components constituting the battery pack 1000 to cause a fire or explosion. The pack coolant pipe housing 610 and the housing cover 620 according to the present embodiment are connected along the pack coolant pipe 600, and it is possible to prevent the leaked coolant from penetrating into the inside of other components.

Meanwhile, as described above, in the conventional battery pack 10 shown in FIG. 1, the HV line 3 or the LV line 4 is complicatedly configured, and the LV line 4 is located at an edge close to the pack housing (not shown). Thus, when external impact or vibration occurs, there is a high possibility that a short circuit occurs.

Referring back to FIGS. 2, 4 and 6, the battery module 100 according to the present embodiment includes a first battery module 100a and a second battery module 100b which face each other in a direction in which the battery cells 110 are stacked (in a direction parallel to the x-axis). The first battery module 100a and the second battery module 100b are composed of two modules, respectively, so that a total of four battery modules 100 may be arranged in a grid pattern. Further, the two first battery modules 100a may be disposed so that the end plates 400 face each other, and the two second battery modules 100b may also be disposed so that the end plates 400 face each other. An opening is formed in the end plate 400, so that a terminal bus bar 710 connected to the HV line 800 and a module connector 740 connected to the LV line 900 can be exposed. That is, in the battery pack 1000 according to the present embodiment, the two first battery modules 100a are arranged so that the end plates 400 face each other, and the two second battery modules 100b are arranged so that the end plates 400 face each other, whereby the HV line 800 and the LV line 900 connected to the four battery modules 100 can be simplified and arranged efficiently.

Further, the HV line 800 connected to the BDU module 1200 may be disposed between the first battery module 100a and the second battery module 100b, and the LV line 900 connected to the BMS module 1300 may be disposed between the first battery module 100a and the second battery module 100b. That is, the HV line 800 and the LV line 900 are located in the center of the plurality of battery modules 100 so that they are not greatly affected by external shocks or the like. Therefore, the possibility of occurrence of a short circuit with respect to the HV line 800 and the LV line 900 can be reduced, and the insulation performance and safety of the battery pack 1000 can be improved.

Meanwhile, referring again to FIG. 4, the bottom portion 210a of the module frame 200 constitutes an upper plate of the heat sink 300, and the recessed portion 340 of the heat sink 300 and the bottom portion 210a of the module frame 200 may form a coolant flow path.

Specifically, the heat sink 300 is formed under the module frame 200, and the heat sink 300 may include a lower plate 310 which forms the framework of the heat sink 300 and is directly joined to the bottom portion 210a of the module frame 200 by welding or the like, and a recessed portion 340 which is a path through which the coolant flows. Further, the heat sink 300 may include a heat sink protrusion 300P which protrudes from one side of the heat sink 300 to a portion where the module frame protrusion 211 is located.

The heat sink protrusion 300P and the module frame protrusion 211 may be directly joined to each other by welding or the like.

The recessed portion 340 of the heat sink 300 corresponds to a portion in which the lower plate 310 is recessed and formed on the lower side. The recessed portion 340 may have a structure in which a cross section cut perpendicularly to the xz plane or yz plane with respect to the direction in which the coolant flow path extends is a U-shaped tube and the bottom portion 210a may be located on the opened upper side of the U-shaped tube. While the heat sink 300 is in contact with the bottom portion 210a, the space between the recessed portion 340 and the bottom portion 210a becomes a region through which the coolant flows, that is, a coolant flow path. Therefore, the bottom portion 210a of the module frame 200 may come into direct contact with the coolant.

The method of manufacturing the recessed portion 340 of the heat sink 300 is not particularly limited, but by providing a structure formed by being recessed with respect to a plate-shaped heat sink 300, a U-shaped recessed portion 340 with an opened upper side may be formed.

The recessed portion 340 may be connected from one of the heat sink protrusions 300P to the other. The coolant supplied through the coolant injection port 500a passes between the first module frame protrusion and the heat sink protrusion 300P, and is first flown in the space between the recessed portion 340 and the bottom portion 210a. Thereafter, the coolant moves along the recessed portion 340, passes between the second module frame protrusion and the heat sink protrusion 300P, and is discharged through the coolant discharge port 500b.

Meanwhile, although not shown, a thermally conductive resin layer containing a thermally conductive resin may be located between the bottom portion 210a of the module frame 200 and the battery cell stack 120 in FIG. 4. The thermally conductive resin layer may be formed by applying a thermally conductive resin to the bottom portion 210a, and curing the applied thermally conductive resin.

The thermally conductive resin may include a thermally conductive adhesive material, and specifically, may include at least one of a silicone material, a urethan material, and an acrylic material. The thermally conductive resin is a liquid during application but is cured after application, and thus, can perform the role of fixing one or more battery cells 110 constituting the battery cell stack 120. Further, since the thermally conductive resin has excellent thermal conductivity properties, heat generated from the battery cell 110 can be quickly transferred to the lower side of the battery module.

The battery module 100 according to the present embodiment implements an integrated cooling structure of the module frame 200 and the heat sink 300 to further improve cooling performance. Since the bottom portion 210a of the module frame 200 plays a role of corresponding to the upper plate of the heat sink 300, the integrated cooling structure can be implemented. The cooling efficiency due to direct cooling is increased, and through a structure in which the heat sink 300 is integrated with the bottom portion 210a of the module frame 200, it is possible to further improve the space utilization rate on the battery module 100 and the battery pack 1000 in which the battery module 100 is mounted Specifically, the heat generated from the battery cell 110 can be transferred to the outside of the battery module 100 through a thermally conductive resin layer (not shown) located between the battery cell stack 120 and the bottom portion 210a, the bottom portion 210a of the module frame 200, and the coolant. By removing the conventional unnecessary cooling structure, the heat transfer path can be simplified and the air gap between respective layers can be reduced, so that the cooling efficiency or performance can be enhanced. In particular, since the bottom portion 210a is composed of an upper plate of the heat sink 300 and the bottom portion 210a comes into direct contact with the coolant, there is an advantage that more direct cooling through the coolant can be performed.

Further, the height of the battery module 100 is reduced through the removal of the unnecessary cooling structure, so that cost can be reduced and space utilization rate can be increased. Furthermore, since the battery module 100 may be disposed in a compact manner, the capacity or output of the battery pack 1000 including a plurality of battery modules 100 may be increased.

Meanwhile, the bottom portion 210a of the module frame 200 may be weld-joined to a portion of the lower plate 310 of the heat sink 300 in which the recessed portion 340 is not formed. Since the present embodiment has the integrated cooling structure of the bottom portion 210a of the module frame 200 and the heat sink 300, it has the effect of not only improving the cooling performance described above, but also supporting the load of the battery cell stack 120 hosed in the module frame 200 and reinforcing the rigidity of the battery module 100. In addition, the lower plate 310 and the bottom portion 210a of the module frame 200 are sealed through welding, etc., so that the coolant can flow without leakage in the recessed portion 340 formed inside the lower plate 310.

For effective cooling, as shown in FIG. 6, it is preferable that the recessed portion 340 is formed over the entire region corresponding to the bottom portion 210a of the module frame 200. For this purpose, the recessed portion 340 may be curved at least once to connect from one side to the other. In particular, the recessed portion 340 is preferably curved several times so that the recessed portion 340 is formed over the entire region corresponding to the bottom portion 210a of the module frame 200. As the coolant moves from the start point to the end point of the coolant flow path formed over the entire region corresponding to the bottom portion 210a of the module frame 200, efficient cooling of the entire region of the battery cell stack 120 may be achieved.

A protruding pattern 340D may be formed in the recessed portion 340 of the heat sink 300 according to the present embodiment.

In the case of a large-area battery module in which the number of stacked battery cells is increased significantly compared to the conventional case, such as the battery cell stack 120 according to the present embodiment, the width of the coolant flow path may be formed wider, the temperature deviation may be more severe. In the large-area battery module, it may include a case in which approximately 32 to 48 battery cells are stacked in one battery module compared to a case in which approximately 12 to 24 battery cells are stacked in one battery module in the past. In this case, since the protrusion pattern 340D according to the present embodiment may have the effect of substantially reducing the width of the cooling passage, the pressure drop can be minimized, and at the same time, the temperature deviation between the widths of the coolant flow path can be reduced. Therefore, a uniform cooling effect can be realized.

Meanwhile, the coolant is a medium for cooling, and is not particularly limited, but may be cooling water.

The terms representing directions such as the front side, the rear side, the left side, the right side, the upper side, and the lower side have been used in the present embodiment, but the terms used are provided simply for convenience of description and may become different according to the location of an object or an observer.

The battery module or the battery pack can be applied to various devices. For example, it can be applied to transportation means such as an electric bike, an electric vehicle, and a hybrid electric vehicle, and may be applied to various devices capable of using a secondary battery, without being limited thereto.

The present disclosure has been described in detail with reference to exemplary embodiments thereof, but the scope of the present disclosure is not limited thereto and modifications and improvements made by those skilled in the part by using the basic concept of the present disclosure, which are defined in the following claims, also belong to the scope of the present disclosure.

DESCRIPTION OF REFERENCE NUMERALS

100: battery module
600: pack coolant pipe
710: terminal bus bar
730: sensing assembly
800: HV line
900: LV line
1200: BDU module
1300: BMS module

The invention claimed is:

1. A battery pack comprising:
a plurality of battery modules, each battery module of the plurality of battery modules including a battery cell stack in which a plurality of battery cells are stacked in a first direction, a terminal bus bar connected to the plurality of battery cells, and a sensing assembly for measuring the temperature and voltage of the plurality of battery cells;
a pack frame for storing the plurality of battery modules, a space being formed between a first battery module and a second battery module of the plurality of battery modules;
at least one high voltage (HV) line connected to the terminal bus bar of the plurality of battery modules;
at least one low voltage (LV) line connected to the sensing assembly of the plurality of battery modules; and
a pack coolant pipe for supplying a coolant to the plurality of battery modules,
wherein the at least one HV line or the at least one LV line is in the space between the first battery module and the second battery module, and
wherein the at least one HV line and the at least one LV line are located above the pack coolant pipe.

2. The battery pack according to claim 1, further comprising a pack coolant pipe housing for storing the pack coolant pipe.

3. The battery pack according to claim 2, further comprising a housing cover for covering an opened upper side of the pack coolant pipe housing, wherein the at least one HV line and the at least one LV line are located above the housing cover.

4. The battery pack according to claim 1, further comprising a BDU (battery disconnect unit) module connected to the at least one HV line to control an electrical connection of the plurality of battery modules.

5. The battery pack according to claim 4, wherein the at least one HV line connected to the BDU module is located between the first battery module and the second battery module.

6. The battery pack according to claim 1, further comprising a BMS (battery management system) module that is connected to the at least one LV line to monitor and control an operation of the plurality of battery modules.

7. The battery pack according to claim 6, wherein the at least one LV line connected to the BMS module is located between the first battery module and the second battery module.

8. The battery pack according to claim 1, wherein the battery module further comprises a module connector for connecting the sensing assembly and the at least one LV line.

9. The battery pack according to claim 8, wherein the battery module further comprises end plates located on open sides of a module frame,
wherein an opening is formed in at least one of the end plates, so that the terminal bus bar and the module connector are exposed, and
the first battery module and the second battery module each comprise two modules, the two first battery modules being disposed so that the end plates face each other, and the two second battery modules being disposed so that the end plates face each other.

10. A device containing the battery pack as set forth in claim 1.

11. The battery pack according to claim 1, wherein the at least one HV line is two HV lines, and
wherein the at least one LV line is between the two HV lines.

12. The battery pack according to claim 1, wherein the at least one LV line is two LV lines, and
wherein the at least one HV line is between the two LV lines.

13. The battery pack according to claim 1, wherein the at least one HV line is two HV lines.

14. The battery pack according to claim 1, wherein each battery module further comprises a heat sink under the plurality of battery cells.

* * * * *